Figure 1:
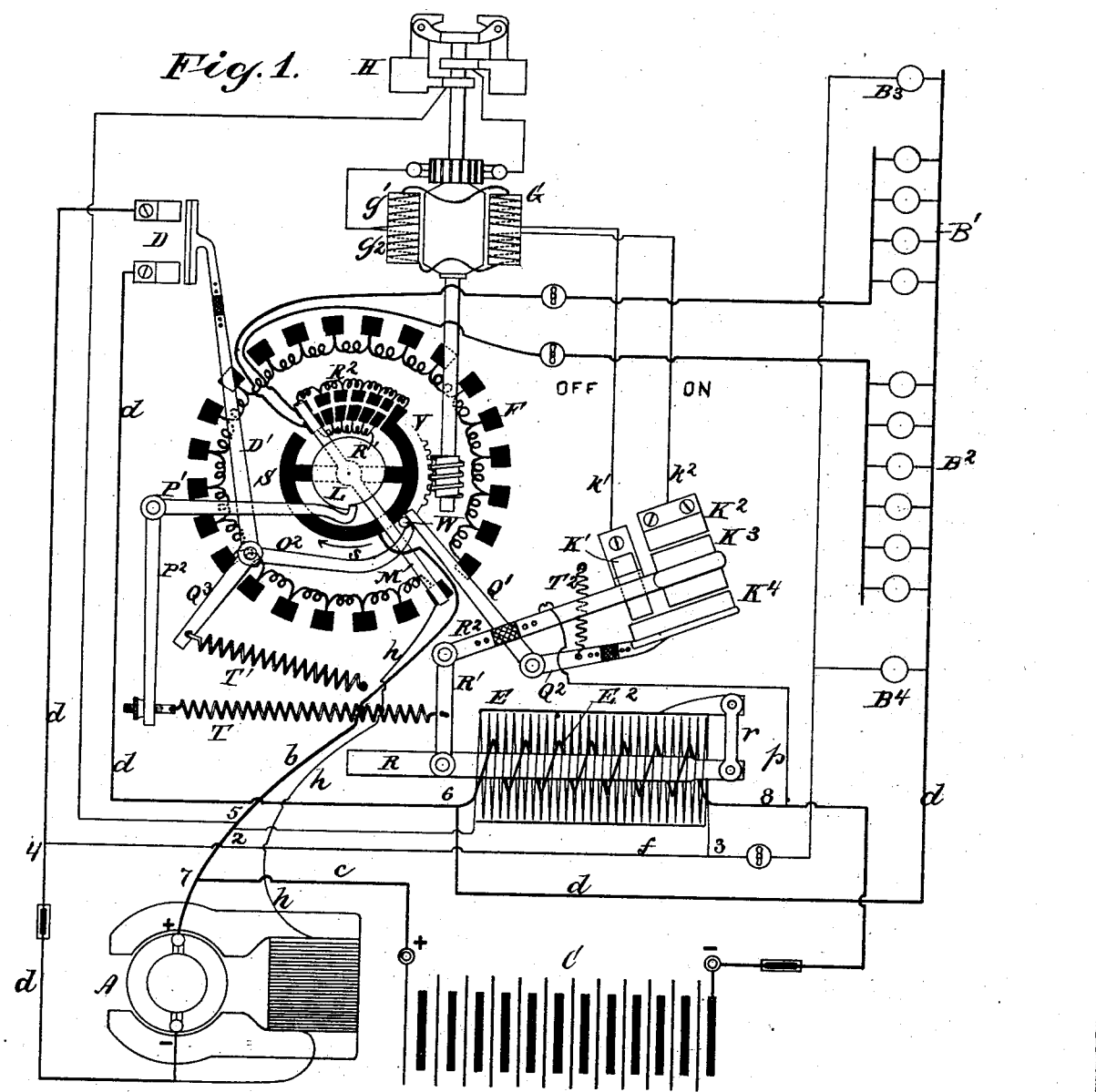

No. 720,608. PATENTED FEB. 17, 1903.
J. F. McELROY.
ELECTRIC TRAIN LIGHTING.
APPLICATION FILED JAN. 13, 1902.
NO MODEL.
2 SHEETS—SHEET 1.

Witnesses
D. W. Gardner
L. L. Shaw

Inventor
James F. McElroy
E. M. Bentley
by
Atty.

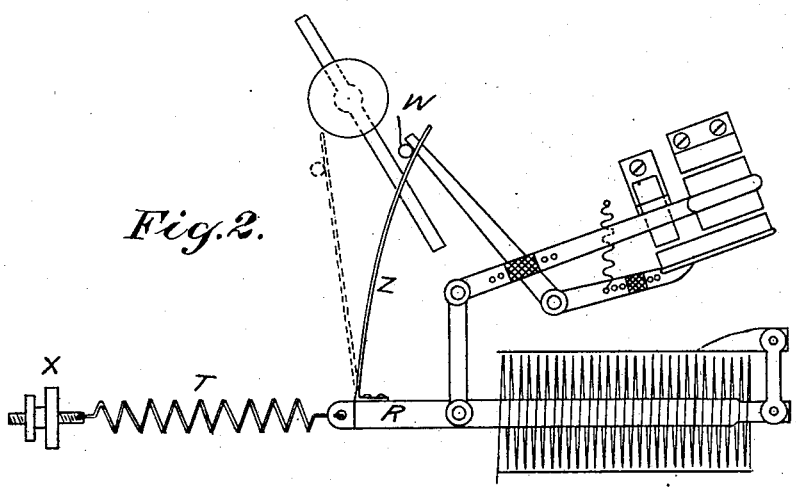

UNITED STATES PATENT OFFICE.

JAMES F. McELROY, OF ALBANY, NEW YORK.

ELECTRIC TRAIN-LIGHTING.

SPECIFICATION forming part of Letters Patent No. 720,608, dated February 17, 1903.

Application filed January 13, 1902. Serial No. 89,404. (No model.)

*To all whom it may concern:*

Be it known that I, JAMES F. MCELROY, a citizen of the United States, residing at Albany, county of Albany, and State of New York, have invented certain new and useful Improvements in Electric Train-Lighting, of which the following is a specification, reference being made to the accompanying drawings, which illustrate the invention aforesaid in Figure 1, a modification appearing in Fig. 2.

In a system of train-lighting heretofore devised by me and shown in certain applications for Letters Patent now pending I have provided a dynamo-electric machine driven by the movement of a car or train and adapted to operate electric lamps thereon. The said dynamo is caused at the same time to charge a storage battery, by means of which the lamps may be operated whenever the dynamo itself is not in operation or is running at a low rate of speed.

My present invention consists in certain improvements upon the system aforesaid, which, however, may also be used in other systems wherever applicable.

One improvement is designed to overcome the difficulty occasionally experienced of a failure of the dynamo to start into operation after a train stops or at the proper time, due, perhaps, to a lack of sufficiently good contact between the brushes and the commutator by reason of the vibrations of the machine while the train is running or by reason of dust or insufficient spring-pressure.

Another feature of improvement consists in a provision whereby electric lamps in the vestibule or upon other desired points of the car or train may be automatically lighted as the train comes to a standstill and automatically extinguished when the train starts, but continuing to burn in the meanwhile during the stoppage of the train.

Still another feature of improvement lies in the starting of the dynamo into action when its pressure due to speed reaches that required for the lamps and the simultaneous operation thereafter of a resistance in the lamp-circuit and a resistance in the field-magnet circuit of the dynamo. At the same time the potential-magnet controlling the dynamo-regulator is automatically adjusted to respond to a gradually-increased standard of constant potential until a potential is reached suitable for charging the battery, but which is too high for the lamps and is applied to them through the lamp resistance aforesaid.

Referring to the accompanying drawings, A represent a dynamo-electric machine, which is understood to be geared to an axle of a car or train or to be otherwise driven by the movement of the car or train at a variable speed.

$B'$ and $B^2$ are groups of electric lamps designed to be operated at a constant potential and to be supplied by the current delivered from the dynamo A.

C is a storage battery designed to be charged by the dynamo A, and for this purpose it is connected to the circuit therefrom in multiple with the lamps.

D is an automatically-operated connection-switch for the dynamo, by means of which it is put into communication with the main circuit on the car or train whenever the dynamo speed gives the required dynamo-pressure and by means of which it is again disconnected from the said circuit when the speed of the dynamo falls below the predetermined point. The said switch D is placed in the line leading from the lower brush of the dynamo A. The opposite brush of the dynamo is connected directly to the storage battery by the line $c$ and to the lamps $B'$ and $B^2$ by the line $b$ whenever the switch D is closed.

A potential-magnet E of the solenoid form is provided in a shunt-circuit parallel to the lamps and battery for the purpose of determining the closure and opening of the aforesaid connection-switch D and also for controlling the dynamo-regulator consisting of the rheostat F, driven by the motor G. The operation of this motor is controlled by the said potential-magnet E. The shunt-circuit of the magnet E starts from the point 2 on the positive line $b$, leading from the dynamo, and after passing through the magnet terminates at a point 3 on a line $f$, leading to the negative line $d$ of the dynamo A at the point 4. The magnet E is therefore immediately in a shunt-circuit across the terminals of the dynamo. The magnet E also contains about six turns of coarse wire, included in the branch circuit which contains the battery C—that is to say, the battery-circuit branches from the line $b$ at the point 7 and then after passing through the battery C goes to the aforesaid turns of coarse wire on magnet E, forming the coil $E^2$, and after passing through the said coil $E^2$ joins the return-wire from the lamps at the point 6. The purpose of this coil $E^2$ is to slightly modify the controlling action of the solenoid E, according to the condition of the storage battery. Thus if the battery is wholly or nearly exhausted an excessive current will tend to flow therein, to the detriment of the battery. In such an event, however, the coil $E^2$ will also receive the same excessive current, since it is in series with the battery, and will so assist the shunt-coil of the magnet E and cause it to respond to a lower voltage than it would respond to were it not for the assistance of the coil $E^2$. This will tend to reduce the pressure of the system, and thereby correct the evil of the excessive current in the battery. This modifying series coil $E^2$ has such a few turns that it will not materially affect the voltage at the lamps, but will still be of material advantage in checking any undue rush of current into the battery when it is in a depleted condition. The regulator-motor G is contained in a shunt-circuit starting from the line $b$ at the point 5, passing thence to the speed-governor H of the motor, thence to the motor-armature, and then branching into two oppositely-wound field-coils $g'$ and $g^2$ in the respective branches it is continued by the wires $k'$ and $k^2$, which terminate, respectively, at the carbon contacts $K'$ and $K^2$. The two field-coils of the motor G, being oppositely-wound, will when energized give different directions of rotation to the motor-armature. Thus the field-coil $g'$ will cause the motor to operate in a direction to throw the regulating-rheostat "on," and the coil $g^2$ will cause the motor to run in a direction to turn the regulating-rheostat "off" or bring it to its zero position, in which it normally stands when the dynamo is not in operation. The regulating resistance F is designed to be included step by step in the field-magnet circuit of the dynamo, which circuit is in shunt to the dynamo-armature; but when the dynamo is at rest or is running at a very low speed none of the said resistance F is included therein. Thus in the condition shown in the diagram the line $b$ leads directly to the contact-ring S of the regulator upon which bears the rotary contact-arm M. The circuit passes from the ring S to the arm M, whence the field-magnet branch passes directly by the line $h$ to the field-magnet coils of the dynamo and thence to the opposite or negative commutator-brush. The main line, however, continues from the said arm M directly to the respective lamp groups $B'$ and $B^2$, and these lamps will be brought into circuit whenever the switch D in the line $d$ is closed.

The control of the regulator by the potential-magnet E is exercised as follows: The core R of the solenoid is suspended horizontally by a link $r$ at one end and at the other end by one arm $R'$ of an angle-lever whose opposite arm $R^2$ carries at its outer extremity a carbon contact $K^3$, adapted to play between the similar contacts $K^2$ and $K^4$. This carbon contact $K^3$ is connected by the line $p$ to the negative terminal of the battery C, the said line $p$ starting from the battery-circuit at the point 8. When the contact $K^3$ bears upon the similar contact $K^2$, the battery-current is delivered from the line $p$ to the line $k^2$ and thence to the motor G through its field-coil $g^2$, which causes the motor to run in a direction to throw the rheostat-arm toward its on position, as before described and as indicated by the arrow $s$. On the other hand, when the said contact $K^3$ rests against the similar contact $K^4$ the battery-current is delivered to the motor through the opposite field-magnet coil $g'$ by means of the line $k'$, (assuming that the said contact $K^4$ rests against the contact $k'$.) This will cause the motor G to run in the opposite direction. Upon the starting of the dynamo and its reaching a speed giving a potential equal to that required by the lamps the potential-magnet E will become energized and attract the core R against the force of its retracting-spring T, and thereby throw the contact $K^3$ against the contact $K^2$ and set the motor G into operation in a direction to turn the arm M of the rheostat in the direction of the arrow $s$. This will accomplish several results. In the first place, the pin W on the wheel B, which carries the arm M, is turned out of engagement with the arm $O^2$ of a three-arm lever and allows the second arm $O'$ thereof to close the switch D, the movable element of the switch being carried upon the said arm $O'$. The said lever is operated when released from pin W by the spring $T'$ which engages the third arm $O^3$. In the second place, the said pin W as it moves allows the arm $Q'$ to move to the left under the influence of the spring $T^2$, so as to bring the contact $K^4$, carried upon the arm $Q^2$ of the angle-lever, against the contact $K'$, and thereby permit the inclosure of the circuit of motor G through its field-magnet $g'$ whenever thereafter the contact $K^3$ comes against the contact $K^4$. The purpose of this is to open the circuit of the motor G and shut off the storage-battery current therefrom whenever the regulator comes back to its zero or off position. By this means it is made certain that the motor G will restore the regulator to its normal condition even if the dynamo-current should be cut off by the blowing of a fuse or any other contingency. If the dynamo-current were relied upon to work the motor G, as would be the case if the wire $p$ were connected to the circuit not at the point 8, but at a point on the dynamo side of the switch D, it might happen that the regulator would be left at some intervening position by the accidental stoppage of the dynamo. The arrangement I have described, therefore, provides that the motor G shall be operated by the battery-current, and in order that the motor may not be left with the battery-current flowing through it, which would tend to exhaust the battery, I have provided for the breaking of the motor-circuit between the contacts K' and K⁴ through the agency of the regulator itself, which as it comes to its final position causes the pin W to engage the arm Q', as above mentioned. In the third place, the starting of the regulator simultaneously begins to introduce one section after another of the resistance F into the field-magnet of the dynamo and also to introduce one section after another of the resistances R' and R² into the lamp-circuits, the resistance R' being in series with a group of lamps B' and the resistance R² in series with a group of lamps B². The purpose of this is to allow of an increase of the dynamo-pressure above the pressure required by the lamps (at which the apparatus will start) in order that the ultimate pressure of the dynamo may be adequate for charging the batteries. At the same time the resistances are brought into the lamp-circuit in order that the increased dynamo-pressure may be reduced at the lamps to the proper pressure for operating them. In my former system I provided that the lamp resistances R' and R² should be inserted in the lamp-circuit prior to the insertion of any corresponding resistance in the field-magnet circuit of the dynamo. The improvement introduced by my present invention is to start the introduction of the field-magnet circuit at the same time with the introduction of the lamp resistance. This serves to avoid the flickering of the lamps on the return movement of the rheostat-arm, which might act to reduce the dynamo-pressure to the lamp-pressure or even below it before cutting out the lamp resistance or, on the other hand, cut the resistance out by the inertia of the rheostat before the required reduction of pressure is attained. By the present arrangement the return movement of the rheostat-arm does not lose control of the dynamo-pressure until all of the lamp resistance has been cut out. In the fourth place, and finally, the starting of the regulator serves to adjust the tension of the retracting-spring T of the potential-magnet E so that it will respond to a maintained but gradually-increasing standard of dynamo-potential. This is accomplished by anchoring the outer end of the said spring T to the extremity of the arm P² of an angle-lever whose opposite arm P' bears at its outer end on the periphery of the cam L. While the rheostat-arm M is moving over the lamp resistances R' and R² to introduce them into the lamp-circuit the tip of lever-arm P' is riding up on the periphery of the cam; but the tightening effect on the spring ceases when the lamp resistance is all in circuit, and thereafter the tension of the spring T remains unchanged. If it were not for this change in tension or some other adjustment of the potential-magnet, the said magnet would allow the voltage to drop back to the lamp-pressure whenever there was any diminution of the speed. In practice the dynamo may be started at, say, sixty volts, and it will regulate to maintain this voltage so long as the speed does not greatly increase. This will allow the dynamo to supply the lamps which are also adapted for sixty volts, and it will also allow the dynamo-current to pass into the lamps without causing any flickering, such as would occur if the dynamo should be connected in at a higher voltage, (it being assumed that in the meanwhile the lamps have been operated by the storage battery, which has a discharging voltage of sixty.) It will not be possible, however, for the dynamo to charge the battery unless its voltage is above the discharging voltage of the battery. For example, it would perhaps be necessary to raise the dynamo-voltage to seventy before it would be able to overcome the electromotive force of the battery and give a charging-current thereto. The adjustment which I have described provides for this increase of the dynamo-pressure up to seventy volts, which, together with the lamp resistances, serves to differentiate the dynamo-pressure applied to battery from that applied to the lamps. I may also adopt other means than the cam L and the angle-lever P' P² for adjusting the potential-magnet. For example, as shown in Fig. 2, I anchor the spring T to a fixed point X and then attach to the end of the core R a thin steel spring Z, whose outer end bears against the pin W, and when the pin is in the position shown in Fig. 1 the spring Z will occupy the position shown in full lines in Fig. 2, where it will exert a tension on the core R counter to the tension of the spring T. This will weaken the force of the spring T and allow the magnet to respond to the lower or lamp voltage. When, however, the regulator starts, the pin W, rotating with the arm M, will gradually relieve the tension on the spring Z until the said spring occupies the position shown by the dotted lines in Fig. 2, and the pin W will then pass out of contact therewith. The release of the counter-tension of the spring Z will, in effect, increase the tension of the spring T, and thereby cause the magnet to respond to a higher voltage, just as in the arrangement shown in Fig. 1. After the voltage of the dynamo reaches its upper limit—say, seventy volts—and the differential pressure is established then the further increase of dynamo speed, together with variations in the demands of the battery and the lamps, is compensated for by the further cutting in or cutting out of the resistance F into or out of the field-magnet circuit of the dynamo. The reverse effects take place when the speed of the train slackens until it finally comes to a standstill. The speed-governor H for the motor G acts by centrifugal force to break the circuit of the motor when its speed becomes too great.

Besides the two groups of lamps B' and B²

I have shown two lamps B³ and B⁴, which will be placed upon the vestibule of the car or cars or in any other position where it is desirable that they should be lighted only when the train is standing still. Various automatic devices may be employed which will cause these lamps to be lighted whenever the train comes to a standstill. For instance, a switch may be operated by the action of the regulator to close the circuit of these lamps B³ and B⁴ as the regulator returns to its off position, and in a copending application I have shown and claimed such a switch. I prefer, however, to simply include these lamps in a circuit shunting the connection-switch D, so that whenever the said switch is open the lamps will be connected with the storage battery in a circuit extending from the positive terminal of the battery by the line c to the point 7, thence through the armature of the dynamo and the line d to the point 4, whence it will pass through the lamps B³ and B⁴ to the negative side of the circuit, which is connected to the negative terminal of the battery through the point 6 and the coil E². This puts the said lamps in series with the dynamo-armature, so that as the dynamo speed decreases after the opening of the switch D the lamps will gradually light up as the electromotive force of the battery exceeds the diminishing electromotive force of the dynamo until they attain their full brilliancy when the dynamo is standing still. When the dynamo starts again, its electromotive force in the lamp-circuit opposes that of the battery and the lamps gradually lose their brilliancy and are finally shunted out entirely by the closure of the switch D. It may be added that the opening of the said switch D is positively effected by the engagement of the pin W of the rheostat with the end of the lever-arm O². The switch D thus acts as an extinguishing and lighting switch, controlling the operative connection of the supplementary lamps with the battery, while the dynamo and regulator mechanism serve as an agent intervening between the car-axle, on the one hand, (which is the original motive power of the organization,) and the switch D, on the other hand, to bring the supplementary lamps into action on the stopping and extinguish them on the movement of the train. I have also found that a shunt-circuit around switch D, such as the one just described, containing lamps B³ and B⁴, is of value in insuring the starting of the dynamo. The presence of the said shunt-circuit maintains a minute flow of current through the dynamo from the battery when the switch D is open and the dynamo at rest or running slowly. There is thus a small current passing at all times from the commutator to the brushes bearing thereon, and whenever the switch D is closed and the dynamo again started it is certain that the generated current will begin to flow, following over the already energized route of the lamp-current. In other words, if the brushes jar a little from the commutator or make bad contact therewith the presence of the small current will cause a minute arc to follow and so preserve the electrical continuity. This has proved a feature of practical importance.

What I claim as new, and desire to secure by Letters Patent, is—

1. In an electric-lighting system, a dynamo feeding lamps and a storage battery in multiple at two different but constant pressures, a connection-switch set to act at the lamp-pressure, a constant-pressure regulator for the dynamo normally in a condition for giving the said lamp-pressure, means for changing the regulator from the lower to the higher pressure, a resistance introduced into the lamp-circuit simultaneously with the said change of pressure, and simultaneously with the introduction of the field-magnet resistance of the regulator.

2. In an electric-lighting system, the combination with a dynamo subject to connection with its circuit at intervals, electric lamps and a storage battery supplied from said dynamo at different but constant pressures respectively, an automatic connection-switch set to act at the lamp-pressure, a constant-pressure regulator for the dynamo normally arranged to give it the said lamp-pressure, an adjuster for the said regulator serving to increase automatically the pressure from the lamp-standard to the battery-charging standard, a field-magnet resistance, and a lamp resistance operated simultaneously with the introduction of said field-magnet resistance into the field-magnet circuit.

3. In an electric-lighting system, the combination with a dynamo subject to connection with and disconnection from its circuit at the lamp-pressure, electric lamps and a storage battery supplied by said dynamo in multiple at different but constant pressures respectively, a constant-pressure regulator for the dynamo arranged to give it the said lamp-pressure, an automatic adjuster for the said regulator to change the pressure from the lamp-standard to the battery-charging standard and vice versa, a resistance in the lamp-circuit, and a controller for said lamp resistance acting to remove it from the lamp-circuit, as the dynamo speed decreases, before the pressure of the dynamo falls to a point equal to the pressure required for the lamps.

4. In a car-lighting system, the combination with a dynamo-electric machine driven by the axle, of lamps operated thereby, a storage battery charged by the dynamo in multiple with the lamps, a supplementary lamp, an automatic extinguishing-switch between said supplementary lamp and the storage battery and operating connections between said switch and the car-axle, whereby the supplementary lamp is extinguished automatically by the movement and lighted by the stopping of the train.

5. In an electric-lighting system, the combination with a variable-speed dynamo, of electric lamps and a storage battery operated thereby, a switch for connecting the dynamo to the circuit upon the attainment of a predetermined speed, and a shunt-circuit in series with both dynamo and battery connecting the opposite terminals of the said switch.

6. In an electric-lighting system the combination with a variable-speed dynamo, of electric lamps and a storage battery operated thereby, a switch for connecting the dynamo to the circuit when its potential reaches a predetermined point, and a connecting-circuit for maintaining a battery-current between the commutator and brushes of the said machine while the said switch is open.

7. In an electric-lighting system the combination with a variable-speed dynamo of electric lamps and a storage battery operated thereby, a switch for connecting the dynamo to the circuit when its potential reaches a certain predetermined point, a shunt-circuit connecting the opposite terminals of said switch in series with both dynamo and battery and a supplementary lamp contained in the said shunt-circuit.

8. In an electric-lighting system the combination with a variable-speed dynamo of electric lamps and a storage battery operated thereby, a switch for connecting the dynamo to the circuit when its potential reaches a predetermined point, a shunt-circuit in series with both dynamos and battery connecting the opposite terminals of the said switch and translating devices in the said circuit subjected to the opposing electromotive forces of the dynamo and the battery.

9. In a train-lighting system the combination with a dynamo driven by the train, electric lamps and a storage battery operated thereby, a switch for connecting the dynamo to the circuit when its potential reaches a predetermined point, a shunt-circuit in series with both battery and dynamo connecting the opposite terminals of the said switch and electric lamps contained in the said shunt-circuit and placed in the vestibules of the train.

10. In a train-lighting system the combination with a variable-speed dynamo driven by the train, of electric lamps and a storage battery operated thereby, electric lamps in the train-vestibules, a controlling-switch therefor, and operating mechanism between said switch and the car-axle, whereby the vestibule-lamps are automatically lighted as the train comes to a standstill and extinguished when the train starts.

11. In an electric-lighting system for railway-vehicles, the combination with a variable-speed dynamo, of a connection-switch set to act at a predetermined speed, a storage battery, and vestibule-lamps connected, upon the operation of said switch, in series with both the dynamo and battery so as to be lighted by the reverse current from the battery as the dynamo stops.

12. In an electric-lighting system for railway-vehicles, the combination with a storage battery, of electric lamps supplied thereby, a variable source of electromotive force acting in opposition to the battery, and dependent on the starting and stopping of the vehicle, and a controlling-switch connecting said lamps in series with both the battery and the said source of electromotive force upon the stopping of the train, whereby the lamps may be operated by the reverse current from the battery as the train stops.

13. In a train-lighting system the combination with a variable-speed dynamo driven by the train of electric lamps and a storage battery operated thereby, an automatic switch for connecting the dynamo to the circuit when its potential reaches a predetermined point and a shunt-circuit between the opposite terminals of the said switch and connecting the battery and the dynamo in series.

14. In a train-lighting system the combination with a dynamo driven by the train, a storage battery operated thereby, a switch for connecting the dynamo to the battery when its potential reaches a predetermined point and vestibule-lamps contained in a shunt around the said switch and in series with the dynamo and the battery.

15. In a train-lighting system the combination with a dynamo driven by the train, electric lamps and a storage battery operated thereby, an automatic switch for connecting the dynamo to the battery when its potential reaches a given point, a potential-magnet controlling the said switch, a regulator for the dynamo for maintaining its potential at a given standard, a shunt-circuit connecting the opposite terminals of the said switch and electric lamps contained in the said shunt-circuit and in series with both the dynamo and the battery.

16. In a regulator for a dynamo-electric machine the combination with a regulating-rheostat of a controlling-magnet therefor, a retracting-spring for the said magnet, a second spring acting in opposition to said retracting-spring and means for varying the tension of said second spring.

17. In a regulator for a dynamo-electric machine the combination with a regulating-rheostat of a motor therefor, a controlling-magnet, a retracting-spring for said magnet, a second spring opposing the retracting-spring and means for automatically adjusting the tension of the second spring by the action of the continued action of the apparatus.

In witness whereof I have hereunto set my hand, this 10th day of January, 1902, before two subscribing witnesses.

JAMES F. NcELROY.

Witnesses:
ERNEST D. JANSEN,
SAMUEL J. SMITH.